United States Patent [19]
Warren, Jr.

[11] Patent Number: 6,054,669
[45] Date of Patent: Apr. 25, 2000

[54] PLASMA MARKING TORCH AND METHOD OF OPERATING SAME

[75] Inventor: Joseph V. Warren, Jr., Florence, S.C.

[73] Assignee: The ESAB Group, Inc., Florence, S.C.

[21] Appl. No.: 09/082,241

[22] Filed: May 20, 1998

[51] Int. Cl.$^7$ ................................................ B23K 10/00
[52] U.S. Cl. .............................. 219/121.39; 219/121.44; 219/121.54; 219/121.55
[58] Field of Search ................................ 219/75, 121.39, 219/121.44, 121.4, 121.54, 121.55, 74

[56] References Cited

U.S. PATENT DOCUMENTS

| | | |
|---|---|---|
| 2,906,858 | 9/1959 | Morton, Jr. . |
| 3,534,388 | 10/1970 | Ito et al. . |
| 3,567,898 | 3/1971 | Fein . |
| 3,619,549 | 11/1971 | Hogan et al. . |
| 3,833,787 | 9/1974 | Couch, Jr. . |
| 3,934,818 | 1/1976 | Arnold . |
| 4,087,670 | 5/1978 | Miller . |
| 4,125,754 | 11/1978 | Wasserman et al. . |
| 5,045,667 | 9/1991 | Iceland et al. . |
| 5,194,715 | 3/1993 | Severance, Jr. et al. . |
| 5,393,952 | 2/1995 | Yamaguchi et al. . |
| 5,414,237 | 5/1995 | Carkhuff . |
| 5,773,788 | 6/1998 | Lu et al. ............................ 219/121.59 |
| 5,893,986 | 4/1999 | Oakley et al. ..................... 219/121.59 |

*Primary Examiner*—Mark Paschall
*Attorney, Agent, or Firm*—Alston & Bird, LLP

[57] ABSTRACT

A plasma marking torch for marking metal workpieces with lines, numbers, or symbols, and which utilizes a non-cutting plasma gas such as argon, and a shield gas which comprises an air/water mist mixture. In one disclosed embodiment, the shield gas passes serially into contact with the electrode and the nozzle so as to efficiently cool the same, and it then passes through an annular orifice surrounding the bore of the nozzle to the workpiece. In another embodiment, provision is made for selectively operating the torch either in a cutting mode, or a marking mode.

19 Claims, 4 Drawing Sheets

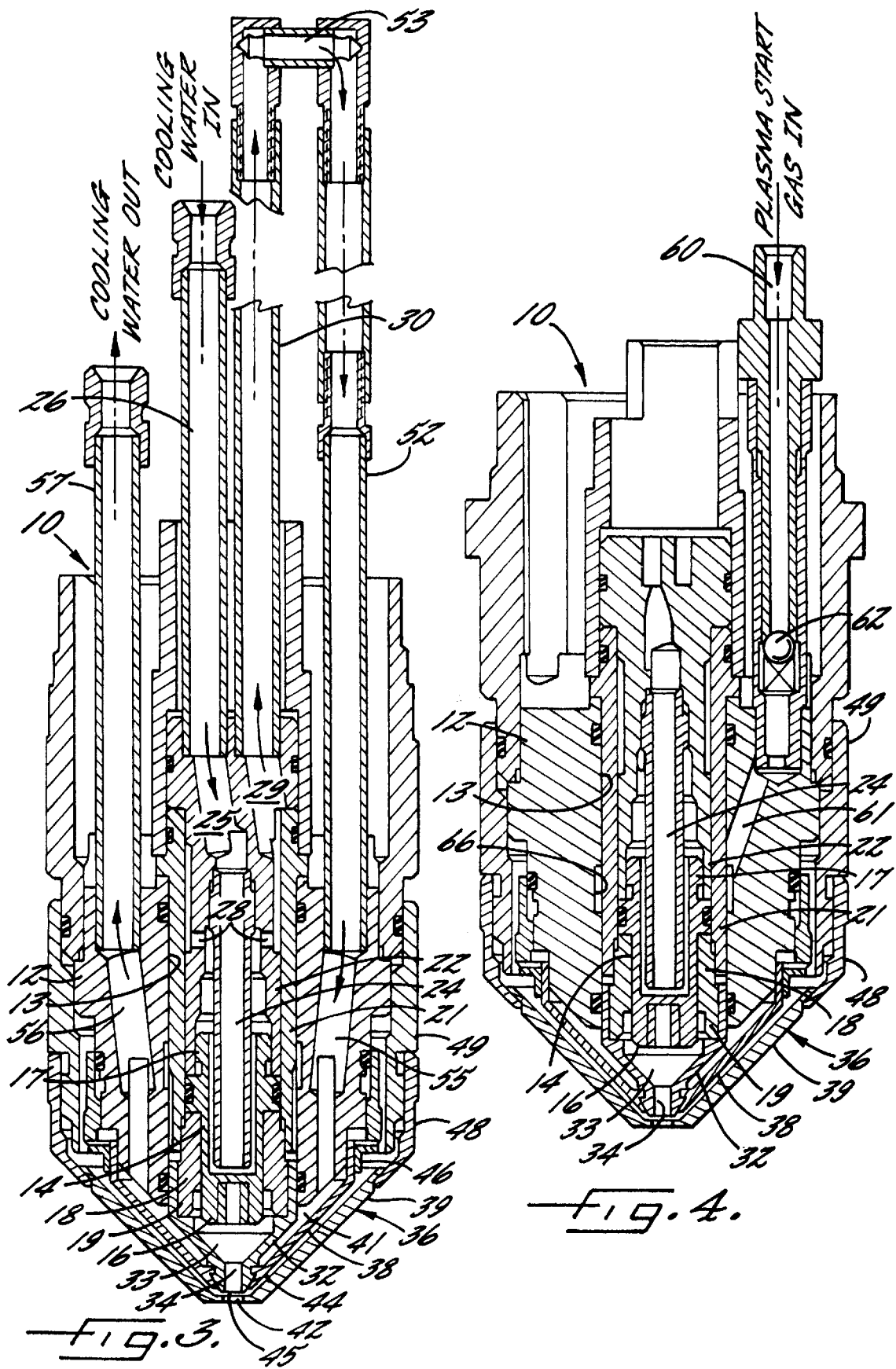

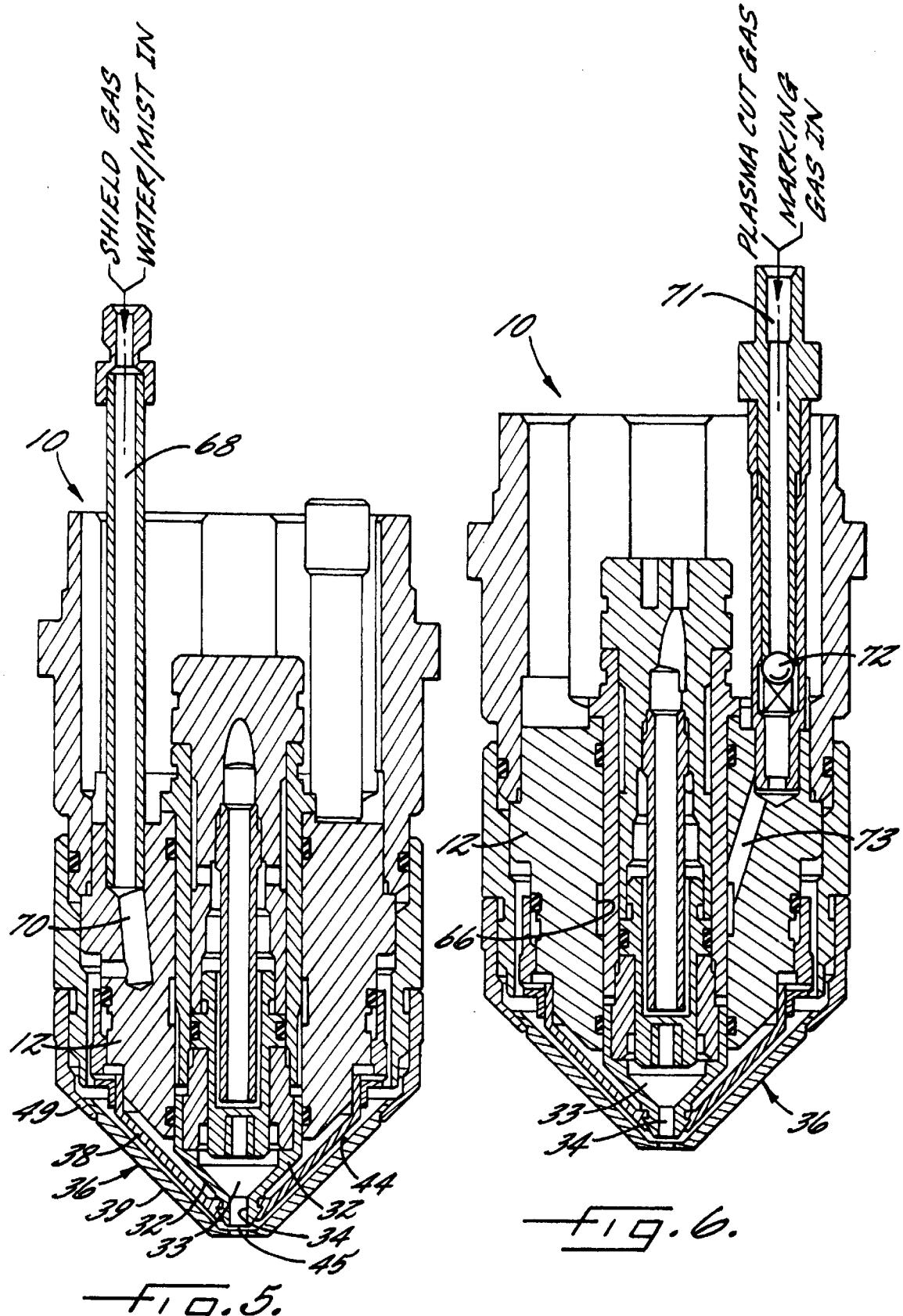

PLASMA MARKING TORCH AND METHOD OF OPERATING SAME

BACKGROUND OF THE INVENTION

The present invention relates to a plasma marking torch which is capable of marking metal workpieces with lines, numbers or symbols.

Known plasma marking torches are commonly employed to mark metal plates and other workpieces with lines, numbers or symbols to facilitate subsequent plate layout and assembly operations. Also, alpha-numeric markings are sometimes employed for plate identification purposes. The known marking torches operate at low amperage (e.g., about 8–10 amps) and they employ a non-cutting gas, such as argon, as the plasma gas, which forms a plasma stream which exits through the nozzle bore and forms an etched plasma mark on the workpiece. The known marking torches also include an air cooling system whereby air is circulated into contact with the inner electrode and then along the outside surface of the torch nozzle so as to exit coaxially about the plasma stream.

It is an object of the present invention to provide a plasma marking torch of the described type which is capable of increased marking speed, and which is able to etch a line of narrow width so as to improve line definition.

It is also an object of the present invention to provide a torch of the described type which minimizes the burn back of the protective primer used on some carbon steel sheeting, and which provides improved cooling of the electrode and the other consumable components of the torch.

It is still another object of the present invention to provide a torch which has the capability of marking a workpiece as described above, but which also has the capability of being shifted to a different operating mode which is capable of cutting the workpiece.

SUMMARY OF THE INVENTION

The above and other objects and advantages of the present invention are achieved by the provision of a plasma arc torch which comprises a torch body defining a longitudinal axis, and an electrode mounted to the torch body along the longitudinal axis and defining a front discharge end. A nozzle is mounted on the torch body to overlie the front discharge end of the electrode and so as to define a plasma cavity therebetween, and the nozzle includes a front wall having a bore therethrough which is aligned with the electrode along the longitudinal axis. A shield is mounted to the torch body so as to overlie in spaced relation the front wall of the nozzle and define an annular gas orifice which coaxially surrounds the bore of the nozzle. A plasma gas passage extends through the torch body and to the plasma cavity, and a plasma gas control is provided for delivering a plasma marking gas to the plasma gas passage and thus to the plasma cavity. Also, a shield gas passage extends through the torch body and to the annular gas orifice, and a shield gas control is provided for delivering a gas/water mist to the shield gas passage and thus to the annular gas orifice. A power supply is also provided for delivering electrical power to the electrode at a relatively low power level which is suitable for plasma marking of a workpiece.

In one embodiment of the invention, the front wall of the nozzle is frusto-conical, and the shield comprises a frusto-conical shield cup which directly overlies the front wall of the nozzle so as to define an annular passage therebetween which forms a portion of the shield gas passage and communicates with the annular gas orifice. Also, the shield gas passage extends into contact with the electrode so as to cool the same, and then leads serially to the annular passage and the annular gas orifice.

In another preferred embodiment, a plasma gas control is provided for selectively delivering either (1) a plasma marking gas or (2) a plasma cutting gas to the plasma gas passage and thus to the plasma cavity, and a shield gas control is provided for selectively delivering either (1) a gas/water mist or (2) a shield gas to the shield gas passage and thus to the annular gas orifice. Further, the power supply is configured to selectively deliver electrical power to the electrode at either (1) a relatively low power level which is suitable for plasma marking of a workpiece or (2) a relatively high level which is suitable for workpiece cutting. With this embodiment, the torch may be selectively operated (1) at the relatively low power level, with the plasma marking gas being delivered to the plasma gas passage, and with the gas/water mist being delivered to the shield gas passage, to permit operation in the workpiece marking mode, or (2) at either a low or high power level, with the plasma cutting gas being delivered to the plasma gas passage, and with the shield gas being delivered to the shield gas passage, to permit operation in the workpiece cutting mode.

BRIEF DESCRIPTION OF THE DRAWINGS

Some of the objects and advantages of the present invention having been stated, others will appear as the description proceeds, when considered in conjunction with the accompanying drawings, in which:

FIGS. 3, 4, 5 and 6 are sectional views of the torch taken respectively along the lines 3—3; 4—4; 5—5; and 6—6 of FIG. 2.

DETAILED DESCRIPTION OF THE PREFERRED EMBODIMENTS

Figure 1:
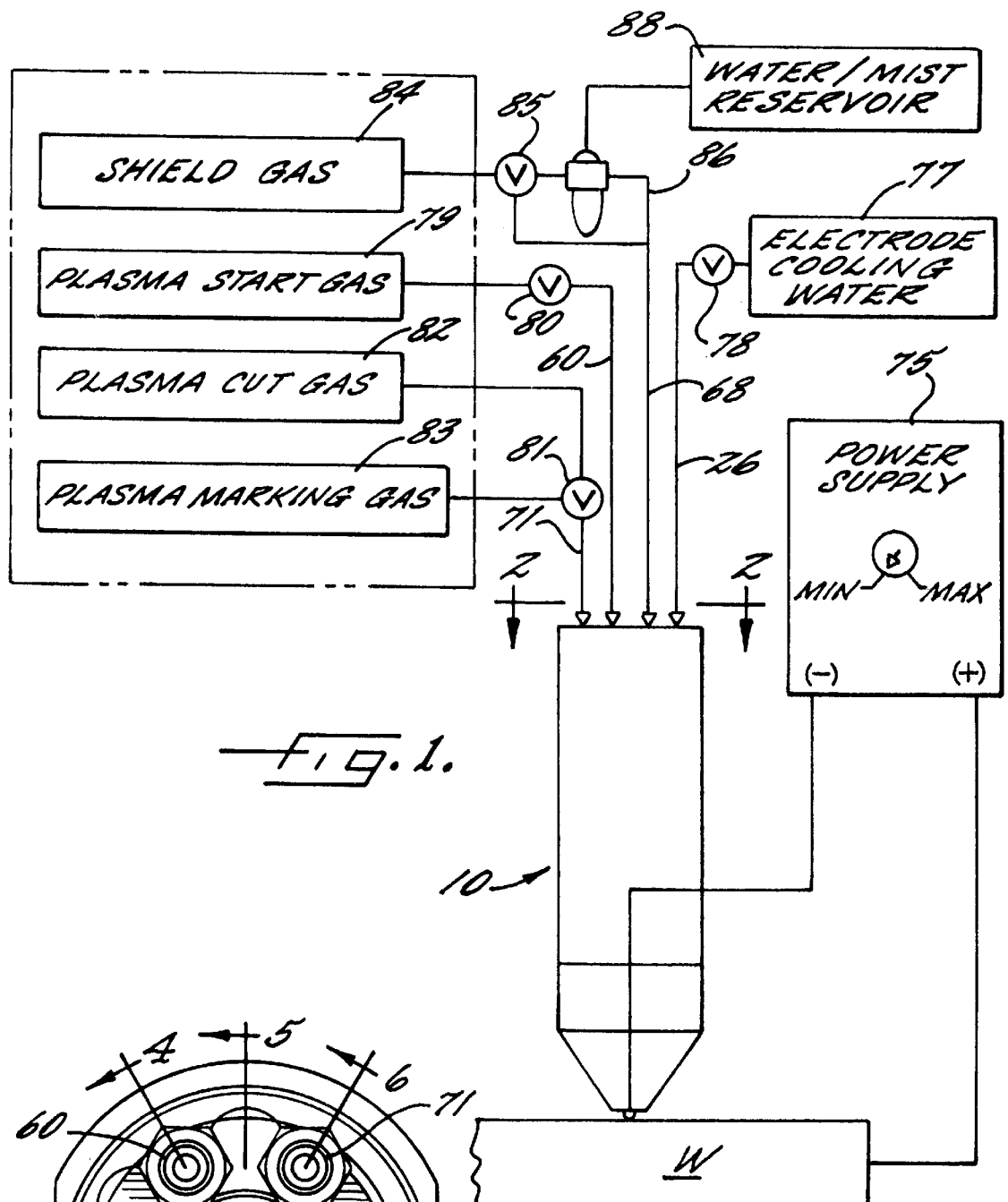
FIG. 1 is a schematic representation of a plasma torch which embodies the features of the present invention.
Figure 2:
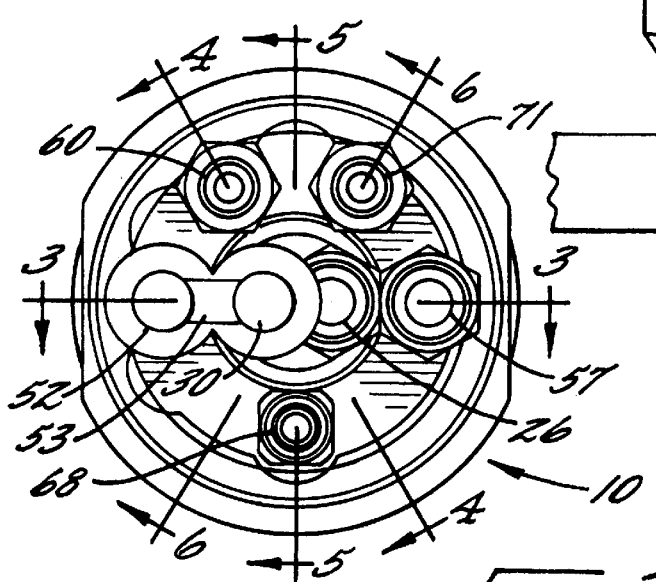
FIG. 2 is a more detailed end view of the torch shown in FIG. 1 and taken substantially along the line 2—2 of FIG. 1.

A plasma torch which embodies the features of the present invention is indicated generally at 10 in FIGS. 1–6, and the torch includes a body 12 having a central bore 13 which defines a longitudinal axis. An electrode 14 is mounted in the central bore of the body 12 so as to extend along the longitudinal axis and define a front discharge end 16. The electrode 14 is of cup shape so as to define a tubular rear end portion 17, and it is typically made of copper or a copper alloy with a silver/hafnium insert.

The electrode 14 is mounted in the bore 13 of the body 12 by a structure which includes a gas baffle 18 which surrounds the forward end portion of the electrode and which defines a depending sleeve 19 which coaxially surrounds the lower end of the electrode. The depending sleeve 19 includes tangentially directed openings in the wall thereof, to impart a swirling motion to a gas passing therethrough, and as further described below. The gas baffle 18 is retained by an outer sleeve 21 which also coaxially engages the mid-portion of the electrode 14. The outer sleeve 21 in turn is received in the central bore 13 of the body 12 of the torch.

The rear end portion 17 of the electrode 14 is threadedly connected to a tubular member 22, which coaxially supports a water baffle tube 24 which extends into the tubular rear portion of the electrode. The member 22 includes a passage 25 which communicates with a water delivery line 26, and the passage 25 also communicates with the internal bore of the water baffle tube 24. The member 22 also includes radial bores 28, which communicate via a second passage 29 in the member 22 with a water outlet line 30, for the purposes described below.

A nozzle 32 is coaxially mounted to the lower end of the gas baffle 18, and the nozzle 32 includes a frusto-conical front wall which defines a plasma cavity 33 immediately below the discharge end 16 of the electrode and which terminates with a bore 34 which is coaxial with the longitudinal axis. A shield 36 is positioned in front of the nozzle 32, and the shield 36 comprises a nozzle retainer 38 and a shield cup 39. The nozzle retainer 38 engages the front extremity of the nozzle 32, and defines a frusto-conical chamber 41 between the front wall of the nozzle 32 and the inner wall of the retainer 38. The shield cup 39 overlies the nozzle retainer 38 in spaced relation, and the shield cup 39 includes a bore 42 which is coaxially aligned forwardly of the bore 34 of the nozzle. An annular passage 44 is thereby defined between the outside of the retainer 38 and the inside of the shield cup 39, and the passage 44 terminates in an annular gas orifice 45 which coaxially surrounds the bore 34 of the nozzle. An insulator ring 46 is disposed in the annular passage 44, and the passage 44 can be configured to impart a swirling motion to the shield gas flowing through the annular passage and to the annular gas orifice 45, as known in the art. The shield cup 39 is supported by a shield cup retainer 48, which is in turn threadedly joined to a shield retainer sleeve 49. The retainer sleeve 49 is threadedly joined to the torch body 12.

The cooling water flow path is best described with respect to FIG. 3. As there illustrated, the water delivery line 26 is connected to the inlet passage 25 in the member 22, which leads to the bore in the water baffle tube 24. The tube 24 is of a diameter smaller than that of the bore in the rear portion 17 of the electrode 14, so as to provide a space for the water to flow back from the lower end of the tube 24, through the pair of radial bores 28 in the member 22, and to the second passage 29 in the member 22. The second passage 29 communicates with the rearwardly extending water outlet line 30, and the line 30 is connected with a further delivery line 52 via a connector 53. The line 52 leads to a passage 55 in the body 12 of the torch such that the water flows into the frusto-conical chamber 41 between the nozzle 32 and the nozzle retainer 38. From the chamber 41, the water flows out through a second passage 56 in the body and to a water outlet line 57.

FIG. 4 illustrates the internal structure for delivering a plasma start gas to the plasma cavity 33 in front of the discharge end 16 of the electrode 14. This delivery structure includes a line 60 which is joined to the body 12 so as to communicate with a passage 61 in the body 12. The line 60 mounts an internal one-way valve 62 in the form of a ball and spring which biases the ball upwardly toward a closed position against a seat formed in the interior of the line 60. The passage 61 in the torch body leads to an annular ring 66 formed in the bore 13 of the body. The annular ring 66 communicates with a pathway (not shown) which extends through the wall of the outer sleeve 21 and along the outside of the gas baffle 18, and such that the gas passes through the tangentially directed openings in the depending sleeve 19 of the gas baffle 18 and so as to enter the plasma cavity 33 in a swirling fashion. From the cavity 33, the gas exits through the bore 34 of the nozzle 32.

FIG. 5 illustrates a shield gas delivery structure which leads to the annular passage 44 formed between the nozzle retainer 38 and the shield cup 39 as described above. This delivery structure includes a line 68 leading to a passage 70 in the body 12 which communicates with the annular space between the inside wall of the shield retainer sleeve 49 and the outside wall of the nozzle retainer 38. From this annular space, the shield gas flows through a swirling structure (not shown) to the annular passage 44, and from the passage 44 the shield gas flows outwardly through the annular gas orifice 45 so as to coaxially surround the plasma stream exiting through the bore 34 of the nozzle 32.

FIG. 6 illustrates the plasma gas delivery structure, which includes a line 71 having a one-way valve 72 comprising a ball and spring, and which is similar to the valve 62 of the plasma start gas delivery structure shown in FIG. 4. From the line 71, the plasma gas is delivered through a passage 73 in the body 12 to the annular ring 66, from which the gas flows to the plasma cavity 33 in the manner described above with respect to FIG. 4.

FIG. 1 schematically illustrates a plasma arc torch 10 as described above and which is connected to its peripheral support equipment so as to be capable of operating either in a workpiece marking mode or in a workpiece cutting mode. As illustrated, the torch 10 is positioned so that its forward end is spaced a short distance above a workpiece W and a power supply 75 is connected to the electrode 14 of the torch and the workpiece W in a conventional manner. The power supply 75 is designed to selectively operate at either a max power setting, which typically delivers about 15 to 100 amps at 100% duty cycle, and a min power setting which typically delivers about 10 to 35 amps at 100% duty cycle. The max power setting is thus suitable for operation in the workpiece cutting mode, and the min setting is suitable for operation in the marking mode.

The water delivery line 26 of the torch is connected to a cooling water source 77 via a valve 78, and the start gas delivery line 60 of the torch is connected to a source 79 of plasma start gas, such as air or nitrogen, via a valve 80. In the marking mode, the start gas could also be argon. The plasma gas delivery line 71 of the torch is connected via a three-way valve 81, to either a plasma cutting gas supply 82, such as air, nitrogen or oxygen, or to a plasma marking gas supply 83, such as argon or a gas mixture containing a high percentage of argon.

The shield gas delivery line 68 of the torch is connected to a shield gas supply 84 via a three-way valve 85. The shield gas typically comprises air, oxygen, nitrogen, $CH_4$, or hydrogen, and the delivery line 68 includes a bypass 86 which includes a water mist reservoir 88. The water reservoir 88 has a flow control valve which permits a selected volume of water mist to be introduced into the gas stream. In operation, the valve 85 can be moved between a closed position, or a first position delivering the shield gas directly to the torch, or a bypass position wherein the shield gas passes through the bypass 86 so that a water mist of a selected volume may be entrained in the gas stream.

The Cutting Mode

To describe the operation of the torch 10 in the cutting mode, the power supply 75 is set at the max setting, while the start gas is delivered to the start gas delivery line 60 and thus to the plasma cavity 33 between the discharge end 16 of the electrode 14 and the nozzle 32. Once the plasma stream is established, the valve 80 is closed and the valve 81 in the plasma gas delivery line is opened so as to permit the plasma cutting gas to enter the plasma gas delivery line 71. The torch is then operating in a mode suitable for cutting a metal workpiece.

The Marking Mode

To convert the torch 10 to the marking mode, the power setting is shifted to the min setting, and the valve 81 is repositioned to direct the plasma marking gas into the plasma gas delivery line 71. Also, the valve 85 is repositioned to direct the shield gas through the bypass 86, so that water mist is entrained in the gas stream which is delivered to the shield gas delivery line 68. In this configuration, the torch is suitable for marking a workpiece. In this regard, the presence of the water mist in the shield gas has been found to narrow the width of the line being etched in the workpiece, and to thereby provide improved definition. Also, the water mist reduces the burn back of any primer on the metal, and it allows faster marking speeds.

In a specific example of a torch operating in the marking mode, the bore 34 of the nozzle 32 has a diameter of between about 0.018 to 0.043 inches, the power delivered to the electrode 14 is about 10 to 35 amps, and the plasma marking gas is 100% argon, which is delivered at a flow rate of 100 SCFH. The shield gas is 100% air, which is delivered at a flow rate of 60 SCFH, and the water mist is delivered to the flow at a maximum rate of about 0.5 GPM.

Figure 7:
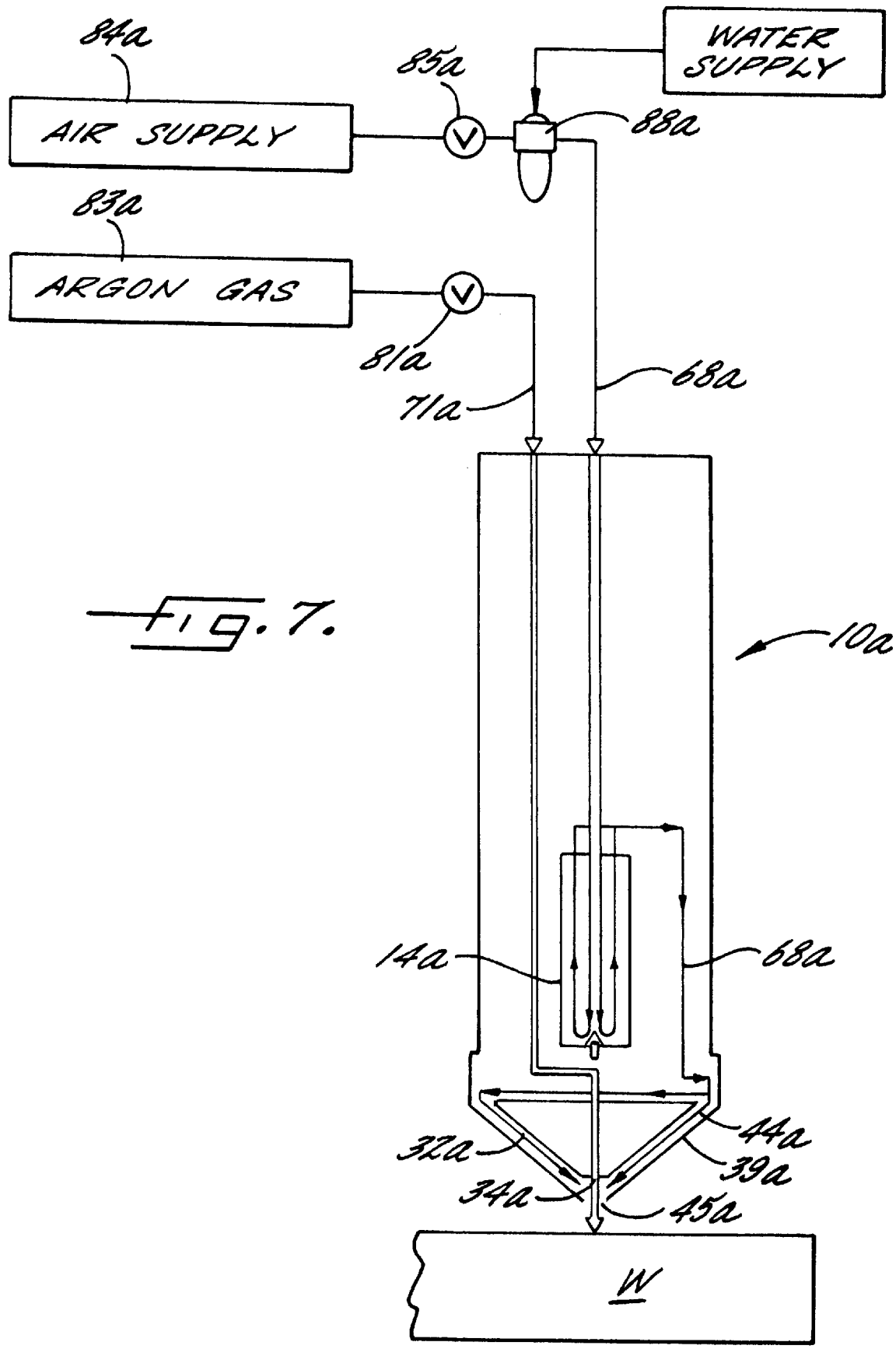
FIG. 7 is a schematic representation of a second embodiment of a torch in accordance with the present invention.

FIG. 7 schematically illustrates a torch 10*a* which embodies the invention, and which is configured to operate exclusively in the marking mode. In this embodiment, the front wall of the nozzle 32*a* is frusto-conical and has a central bore 34*a* as described above with respect to the embodiment of FIGS. 1–6. The shield comprises a frusto-conical shield cup 39*a* which directly overlies the front wall of the nozzle 32*a* so as to define an annular passage 44*a* therebetween and which terminates in a annular gas orifice 45*a* which coaxially surrounds the bore 34*a* of the nozzle. Also in this embodiment, the shield gas line 68*a* of the torch first comes in contact with the tubular rear portion of the electrode 14*a*, similar to the water flow path as described above with respect to FIG. 3, and the shield gas line 68*a* then is directed to the annular passage 44*a* between the nozzle and the shield cup 39*a*, so as to pass outwardly to the annular gas orifice 45*a* and exit coaxially about the plasma stream. The shield gas delivery line 68*a* includes a shield gas source 84*a*, such as compressed air, and the line 68*a* includes a water mist reservoir 88*a* which includes a valve 85*a* for admitting a controlled amount of water mist which is entrained with the air. The plasma gas line 71*a* is connected to a source 83*a* of non-cutting marking gas, such as argon, via a valve 81*a*.

In operation, the torch 10*a* of FIG. 7 is operated at a power level of about 10 to 35 amps, while the argon is delivered to the plasma cavity below the discharge end of the electrode 14*a*. Also, the air/water mist moves serially into contact with the electrode 14*a* and then passes outwardly through the annular orifice 45*a* formed by the shield cup 39*a*. The air/water mist thus cools the electrode as well as the outer portion of the nozzle 32*a*, and the mist then flows to the surface of the workpiece W being marked, thereby providing the advantages noted above.

That which is claimed is:

1. A plasma arc torch adapted for marking a workpiece, and comprising
    a torch body defining a longitudinal axis,
    an electrode mounted to the torch body along the longitudinal axis and defining a front discharge end,
    a nozzle mounted on the torch body to overlie the front discharge end of the electrode and so as to define a plasma cavity therebetween, with said nozzle including a front wall having a bore therethrough which is aligned with the electrode along the longitudinal axis,
    a shield mounted to the torch body so as to overlie in spaced relation the front wall of the nozzle and define an annular gas orifice which coaxially surrounds the bore of the nozzle,
    a plasma gas passage extending through the torch body and to the plasma cavity,
    a plasma gas control for delivering a plasma marking gas to the plasma gas passage and thus to the plasma cavity,
    a shield gas passage extending through the torch body and to the annular gas orifice,
    a shield gas control for delivering a gas/water mist to the shield gas passage and thus to the annular gas orifice, and
    a power supply for delivering electrical power to the electrode at a relatively low power level which is suitable for plasma marking of a workpiece.

2. The plasma arc torch as defined in claim 1 wherein the power supply is configured to deliver between about 15 to 35 amps to the electrode.

3. The plasma torch as defined in claim 1 wherein the front wall of the nozzle is frusto-conical, and wherein the shield comprises a frusto-conical shield cup which directly overlies the front wall of the nozzle so as to define an annular passage therebetween which forms a portion of the shield gas passage and communicates with the annular gas orifice.

4. The plasma torch as defined in claim 3 wherein the shield gas passage extends into contact with the electrode so as to cool the same, and then leads serially to said annular passage and said annular gas orifice.

5. The plasma torch as defined in claim 4 wherein the diameter of said nozzle bore is between about 0.018 to 0.043 inches.

6. The plasma torch as defined in claim 1 wherein the front wall of the nozzle is frusto-conical, and wherein the shield comprises a frusto-conical nozzle retainer which directly overlies the front wall of the nozzle, and a frusto-conical shield cup which overlies the nozzle retainer so as to define an annular passage therebetween which forms a portion of the shield gas passage and communicates with the annular gas orifice.

7. A method of operating a plasma arc torch so as to form an etched marking on the surface of a metal workpiece comprising the steps of
    providing a plasma arc torch which comprises
    (a) a torch body defining a longitudinal axis,
    (b) an electrode mounted to the torch body along the longitudinal axis and defining a front discharge end,
    (c) a nozzle mounted on the torch body to overlie the front discharge end of the electrode and so as to define a plasma cavity therebetween, with said nozzle including a front wall having a bore therethrough which is aligned with the electrode along the longitudinal axis,
    (d) a shield mounted to the torch body so as to overlie in spaced relation the front wall of the nozzle and define an annular gas orifice which coaxially surrounds the bore of the nozzle,
    (e) a plasma gas passage extending through the torch body and to the plasma cavity,
    (f) a shield gas passage extending through the torch body and to the annular gas orifice,
    delivering a plasma marking gas to the plasma gas passage and thus to the plasma cavity, delivering a gas/water mist to the shield gas passage and thus to the annular gas outlet, and delivering electrical power to the electrode at a relatively low power level which is suitable for plasma marking of a workpiece.

8. The method as defined in claim 7 wherein the plasma gas is selected from the group consisting of argon and mixtures containing a significant quantity of argon.

9. The method as defined in claim 8 wherein the gas/water mist comprises air/water mist.

10. A plasma arc torch having the capability of operating either in a workpiece marking mode or in a workpiece cutting mode, and comprising a torch body defining a longitudinal axis, an electrode mounted to the torch body along the longitudinal axis and defining a front discharge end, a nozzle mounted on the torch body to overlie the front discharge end of the electrode and so as to define a plasma cavity therebetween, with said nozzle including a front wall having a bore therethrough which is aligned with the electrode along the longitudinal axis, a shield mounted to the torch body so as to overlie in spaced relation the front wall of the nozzle and define an annular gas orifice which coaxially surrounds the bore of the nozzle, a plasma gas passage extending through the torch body and to the plasma cavity, a plasma gas control for selectively delivering either (1) a plasma marking gas or (2) a plasma cutting gas to the plasma gas passage and thus to the plasma cavity, a shield gas passage extending through the torch body and to the annular gas orifice, a shield gas control for selectively delivering either (1) a gas/water mist or (2) a shield gas to the shield gas passage and thus to the annular gas orifice, a power supply for selectively delivering electrical power to the electrode at either (1) a relatively low power level which is suitable for plasma marking of a workpiece or (2) a relatively high level which is suitable for workpiece cutting, whereby the torch may be selectively operated (1) at the relatively low power level, with the plasma marking gas being delivered to the plasma gas passage, and with the gas/water mist being delivered to the shield gas passage, to permit operation in the workpiece marking mode, or (2) at the relatively high power level, with the plasma cutting gas being delivered to the plasma gas passage, and with the shield gas being delivered to the shield gas passage, to permit operation in the workpiece cutting mode.

11. The plasma arc torch as defined in claim 10 further comprising a water circulating passage extending through the torch body so as to permit cooling water to serially contact the electrode and the front wall of the nozzle.

12. The plasma torch as defined in claim 11 wherein the front wall of the nozzle is frusto-conical, and wherein the shield comprises a frusto-conical nozzle retainer which directly overlies the front wall of the nozzle, and a frusto-conical shield cup which overlies the nozzle retainer so as to define an annular passage therebetween which forms a portion of the shield gas passage and communicates with the annular gas orifice.

13. The plasma arc torch as defined in claim 12 wherein the nozzle retainer is spaced from the front wall of the nozzle so as to form a chamber therebetween, and wherein the water circulating passage communicates with the chamber.

14. The plasma arc torch as defined in claim 13 further comprising a start gas passage extending through the torch body and to the plasma cavity, so as to permit a start gas to be selectively delivered to the plasma cavity.

15. A method of selectively operating a plasma arc torch so as to permit operation in either a workpiece marking mode or in a workpiece cutting mode, and comprising the steps of providing a plasma arc torch which comprises (a) a torch body defining a longitudinal axis, (b) an electrode mounted to the torch body along the longitudinal axis and defining a front discharge end, (c) a nozzle mounted on the torch body to overlie the front discharge end of the electrode and so as to define a plasma cavity therebetween, with said nozzle including a front wall having a bore therethrough which is aligned with the electrode along the longitudinal axis, (d) a shield mounted to the torch body so as to overlie in spaced relation the front wall of the nozzle and define an annular gas orifice which coaxially surrounds the bore of the nozzle, (e) a plasma gas passage extending through the torch body and to the plasma cavity, (f) a shield gas passage extending through the torch body and to the annular gas orifice, selectively delivering either (1) a plasma marking gas or (2) a plasma cutting gas to the plasma gas passage and thus to the plasma cavity, selectively delivering either (1) a gas/water mist or (2) a shield gas to the shield gas passage and thus to the annular gas orifice, and selectively delivering power to the electrode either at (1) a relatively low power level which is suitable for plasma marking of a workpiece or (2) a relatively high power level which is suitable for workpiece cutting.

16. The method as defined in claim 15 wherein the plasma marking gas is selected from the group consisting of argon and mixtures containing a significant quantity of argon.

17. The method as defined in claim 16 wherein the plasma cutting gas is selected from the group consisting of air, nitrogen, oxygen, and mixtures thereof.

18. The method as defined in claim 17 wherein the gas/water mist comprises air/water mist.

19. The method as defined in claim 18 wherein the shield gas is selected from the group consisting of air, nitrogen, $CH_4$, hydrogen, and mixtures thereof.

* * * * *